(12) United States Patent
Inoue et al.

(10) Patent No.: US 9,843,197 B2
(45) Date of Patent: Dec. 12, 2017

(54) WIRELESS POWER RECEIVING APPARATUS

(71) Applicant: ROHM CO., LTD., Ukyo-Ku, Kyoto (JP)

(72) Inventors: Naoki Inoue, Kyoto (JP); Daisuke Uchimoto, Kyoto (JP); Masatoshi Watanabe, Kyoto (JP)

(73) Assignee: ROHM CO., LTD., Ukyo-Ku, Kyoto (JP)

( * ) Notice: Subject to any disclaimer, the term of this patent is extended or adjusted under 35 U.S.C. 154(b) by 337 days.

(21) Appl. No.: 14/621,895

(22) Filed: Feb. 13, 2015

(65) Prior Publication Data

US 2015/0162755 A1 Jun. 11, 2015

Related U.S. Application Data

(63) Continuation of application No. PCT/JP2013/005330, filed on Sep. 9, 2013.

(30) Foreign Application Priority Data

Sep. 21, 2012 (JP) .................................. 2012-208830

(51) Int. Cl.
*H02J 5/00* (2016.01)
*H02J 7/02* (2016.01)
(Continued)

(52) U.S. Cl.
CPC .............. *H02J 5/005* (2013.01); *H01F 38/14* (2013.01); *H02J 7/025* (2013.01); *H02J 50/10* (2016.02);
(Continued)

(58) Field of Classification Search
CPC .. H02J 5/005; H02J 7/025; H02J 50/10; H02J 50/12; H02J 50/60; H02J 50/80; H02J 50/90; H01F 38/14; G06F 1/26
See application file for complete search history.

(56) References Cited

U.S. PATENT DOCUMENTS

| 8,314,513 | B2* | 11/2012 | Aoyama | ................. | H02J 5/005 |
| | | | | | 307/104 |
| 9,553,485 | B2* | 1/2017 | Singh | ...................... | H02J 17/00 |

(Continued)

FOREIGN PATENT DOCUMENTS

| CN | 101572423 A | 11/2009 |
| JP | 2008206295 A | 9/2008 |

(Continued)

OTHER PUBLICATIONS

Korean Notification of Reason for Refusal corresponding to Application No. 10-2014-7032259; dated Oct. 13, 2016, with English translation.

(Continued)

*Primary Examiner* — Patrick O'Neill
(74) *Attorney, Agent, or Firm* — Cantor Colburn LLP (57) ABSTRACT

A rectifier circuit rectifies a current that flows through a reception coil. A smoothing capacitor is connected to the output of the rectifier circuit. A judgment unit generates a notification signal that corresponds to a comparison result obtained by comparing the voltage $V_{RECT}$ across the smoothing capacitor with a predetermined threshold voltage at a judgment timing. The judgment timing is positioned after the start of reception of a signal from a power supply apparatus.

17 Claims, 4 Drawing Sheets

(51) Int. Cl.
    *H02J 50/60*    (2016.01)
    *H02J 50/80*    (2016.01)
    *H02J 50/10*    (2016.01)
    *H02J 50/90*    (2016.01)
    *H01F 38/14*    (2006.01)
    *H02M 7/06*     (2006.01)
    *G06F 1/26*     (2006.01)

(52) U.S. Cl.
    CPC .............. *H02J 50/60* (2016.02); *H02J 50/80* (2016.02); *H02J 50/90* (2016.02); *H02M 7/064* (2013.01); *G06F 1/26* (2013.01)

(56) References Cited

U.S. PATENT DOCUMENTS

| | | | | |
|---|---|---|---|---|
| 2010/0026236 A1* | 2/2010 | Kamiyama | ............ | H02J 7/025 320/108 |
| 2010/0225173 A1 | 9/2010 | Aoyama et al. | | |
| 2012/0235637 A1 | 9/2012 | Tanabe | | |

FOREIGN PATENT DOCUMENTS

| | | |
|---|---|---|
| JP | 2009124889 A | 6/2009 |
| JP | 2010213414 A | 9/2010 |
| JP | 2011229265 A | 11/2011 |
| JP | 2012170194 A | 9/2012 |
| KR | 1020100093429 A | 8/2010 |
| TW | 201223062 A | 6/2012 |
| WO | 2011132507 A1 | 10/2011 |

OTHER PUBLICATIONS

Taiwanese Office Action corresponding to Application No. 102133973 ; dated Sep. 26, 2016, with English translation.
Japanese Notification of Reasons for Refusal corresponding to Application No. 2012-208830; dated Nov. 29, 2016, with English translation.
Korean Notification of Reason(s) for Refusal corresponding to Patent Application No. 10-2014-7032259; dated Apr. 18, 2016, with English translation.
Chinese Office Action corresponding to Patent Application No. 201380022608.8; dated Jul. 5, 2016, with English translation.
Notification of Reasons for Refusal for corresponding Japanese Application No. 2012-208830; dated Jul. 4, 2017.

* cited by examiner

WIRELESS POWER RECEIVING APPARATUS

CROSS REFERENCE

This application is a continuation under 35 U.S.C. §120 of PCT/JP2013/005330, filed Sep. 9, 2013, which is incorporated herein by reference and which claimed priority to Japanese Application No. 2012-208830, filed Sep. 21, 2012, the entire content of which is also incorporated herein by reference.

BACKGROUND OF THE INVENTION

1. Field of the Invention

The present invention relates to a wireless power supply technique.

2. Description of the Related Art

In recent years, in order to supply electric power to an electronic device, contactless power transmission (which is also referred to as "contactless power supply" or "wireless power supply") has begun to come into commonplace use. In order to advance the compatibility of products between manufacturers, the WPC (Wireless Power Consortium) has been organized, and the WPC has developed the Qi standard as an international standard.

A wireless power supply that conforms to the Qi standard makes use of electromagnetic induction between a transmission coil and a reception coil. The power supply system comprises a power supply apparatus including a transmission coil and a power receiving terminal including a reception coil. In the power supply operation, the power supply apparatus and the power receiving terminal are neither mechanically bound nor coupled with each other. Thus, the relative positions of the transmission coil and the reception coil can be set as desired. Furthermore, it is conceivable that a foreign substance such as a piece of metal can be interposed between the transmission coil and the reception coil. The degree of coupling between the transmission coil and the reception coil can change due to such causes With wireless power supply that conforms the Qi standard, by controlling the transmission power by means of communication between the power receiving terminal and the power supply apparatus, such an arrangement allows required electric power to be supplied to the power receiving terminal even if the transmission coil and the reception coil couple with a poor degree of coupling. In other words, even if power cannot be supplied with high efficiency, power supply is maintained by best-effort coupling. Thus, there is room for further improvement from the viewpoint of power efficiency.

SUMMARY OF THE INVENTION

The present invention has been made in order to solve such a problem. Accordingly, it is an exemplary purpose of an embodiment of the present invention to provide a wireless power receiving apparatus which is capable of detecting a low power supply efficiency state due to deviation of the coil position, the approach of a foreign substance, or the like.

An embodiment of the present invention relates to a wireless power receiving apparatus. The wireless power receiving apparatus comprises: a reception coil; a rectifier circuit that rectifies a current that flows through the reception coil; a smoothing capacitor connected to an output of the rectifier circuit; and a judgment unit that generates a notification signal that corresponds to a comparison result obtained by comparing a voltage across the smoothing capacitor with a predetermined threshold voltage at a judgment timing, wherein the judgment timing is positioned after the wireless power receiving apparatus starts to receive a signal from a power supply apparatus.

Immediately after the start of signal transmission from the power supply apparatus, the control operation for the power transmission is not performed. Thus, in this stage, the voltage across the smoothing capacitor exhibits a level that corresponds to the degree of coupling between the transmission coil and the reception coil. With such an embodiment, by monitoring the voltage across the smoothing capacitor at a judgment timing before the power supply apparatus starts to perform the control operation for power transmission, such an arrangement is capable of detecting a state in which the power supply efficiency becomes low due to deviation of the position of the reception coil or due to a foreign substance in the vicinity of the reception coil.

Also, the judgment unit may comprise: an A/D converter that converts the voltage across the smoothing capacitor into a digital value; and a logic unit that compares, with a predetermined threshold value, the digital value at the judgment timing, and that generates the notification signal that corresponds to a comparison result.

Also, the judgment unit may comprise: a comparator that compares the voltage across the smoothing capacitor with a predetermined threshold value, and that generates a comparison signal which indicates a comparison result; and a logic unit that generates the notification signal based on the comparison signal at the judgment timing after the start of reception of the signal from the power supply apparatus.

Also, the judgment timing may be positioned after a predetermined period of time elapses after the start of reception of a signal from the power supply apparatus.

Also, the judgment timing may be positioned after a predetermined period of time elapses after a phase transition from a first phase to a second phase, wherein in the first phase, the power supply apparatus performs a search operation so as to detect whether or not there is an object on a power supply surface of the power supply apparatus.

Also, the judgment timing may positioned in a second phase in which the power supply apparatus judges whether or not a selected object includes a wireless power receiving apparatus to be supplied with electric power. Also, the judgment timing may be positioned in a third phase in which the power supply apparatus acquires information with respect to the wireless power receiving apparatus and performs preparations to supply power.

Also, the judgment timing may be positioned immediately before the end of the third phase.

In the second phase and in the third phase, the voltage across the smoothing capacitor exhibits a stable value. Thus, by monitoring the voltage across the smoothing capacitor in such a period, such an arrangement is capable of detecting deviation of the position of the reception coil and a foreign substance in the vicinity of the reception coil with high precision.

The wireless power receiving apparatus may conform to the Qi standard. In this case, the first phase, the second phase, the third phase, and the fourth phase may correspond to the selection phase, the ping phase, the identification and configuration phase, and the power transfer phase, respectively.

Another embodiment of the present invention relates to an electronic device. The electronic device comprises: any one of the aforementioned wireless power receiving apparatuses; and a display apparatus. Also, the display apparatus may display an image that suggests that the electronic device is located at an unsuitable position according to the notification signal.

This allows the user of the electronic device to recognize the deviation of the coil position. This becomes a cue for searching for an optimum position at which the electronic device is to be located.

Yet another embodiment of the present invention also relates to an electronic device. The electronic device comprises any one of the aforementioned wireless power receiving apparatuses. The electronic device may be configured to transmit, to the power supply apparatus, a signal that corresponds to the notification signal generated by the wireless power receiving apparatus.

Such an arrangement allows the power supply apparatus to execute an operation according to the notification signal. For example, the power supply apparatus may sound an alarm that suggests that the electronic device is located at an unsuitable position. Also, the power supply apparatus may suspend the power supply operation.

Yet another embodiment of the present invention also relates to a wireless power receiving apparatus. The wireless power receiving apparatus comprises: a reception coil; a rectifier circuit that rectifies a current that flows through the reception coil; a smoothing capacitor connected to an output of the rectifier circuit; and a judgment unit that generates a detection signal that corresponds to a voltage across the smoothing capacitor at a judgment timing after the start of reception of a signal from a power supply apparatus.

Immediately after the start of signal transmission from the power supply apparatus, the control operation for the power transmission is not performed. Thus, in this stage, the voltage across the smoothing capacitor exhibits a level that corresponds to the degree of coupling between the transmission coil and the reception coil. With such an embodiment, by monitoring the voltage across the smoothing capacitor at a judgment timing before the power supply apparatus starts to perform the control operation for power transmission, such an arrangement is capable of acquiring information with respect to the position of the reception coil.

Also, the judgment timing may be positioned after a predetermined period of time elapses after the start of reception of a signal from the power supply apparatus.

Also, the judgment timing may be positioned after a predetermined period of time elapses after a phase transition to a second phase after an end of a first phase in which the power supply apparatus performs a search operation so as to detect whether or not there is an object on a power supply surface provided by the power supply apparatus.

Also, the judgment timing may be included in a second phase in which the power supply apparatus judges whether or not a selected object includes a wireless power receiving apparatus to be supplied with electric power, or otherwise in a subsequent third phase in which the power supply apparatus acquires information with respect to the wireless power receiving apparatus and performs preparations to supply power.

Also, the judgment timing may be positioned immediately before the end of the third phase.

In the second phase and in the third phase, the voltage across the smoothing capacitor exhibits a stable value. Thus, by monitoring the voltage across the smoothing capacitor in such a period, such an arrangement is capable of acquiring information with respect to the reception coil with high precision.

Yet another embodiment of the present invention relates to an electronic device. The electronic device comprises: any one of the aforementioned wireless power receiving apparatuses; and a display apparatus. Also, the electronic device may be configured to instruct the display apparatus to display information that corresponds to the detection signal.

This allows the user of the electronic device to recognize the deviation of the coil position. This becomes a cue for searching for an optimum position at which the electronic device is to be located.

Yet another embodiment of the present invention also relates to an electronic device. The electronic device comprises any one of the aforementioned wireless power receiving apparatuses. The electronic device may be configured to transmit, to the power supply apparatus, information that corresponds to the detection signal received from the wireless power receiving apparatus.

Such an arrangement allows the power supply apparatus to execute an operation according to the notification signal.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

First Embodiment

Figure 1:
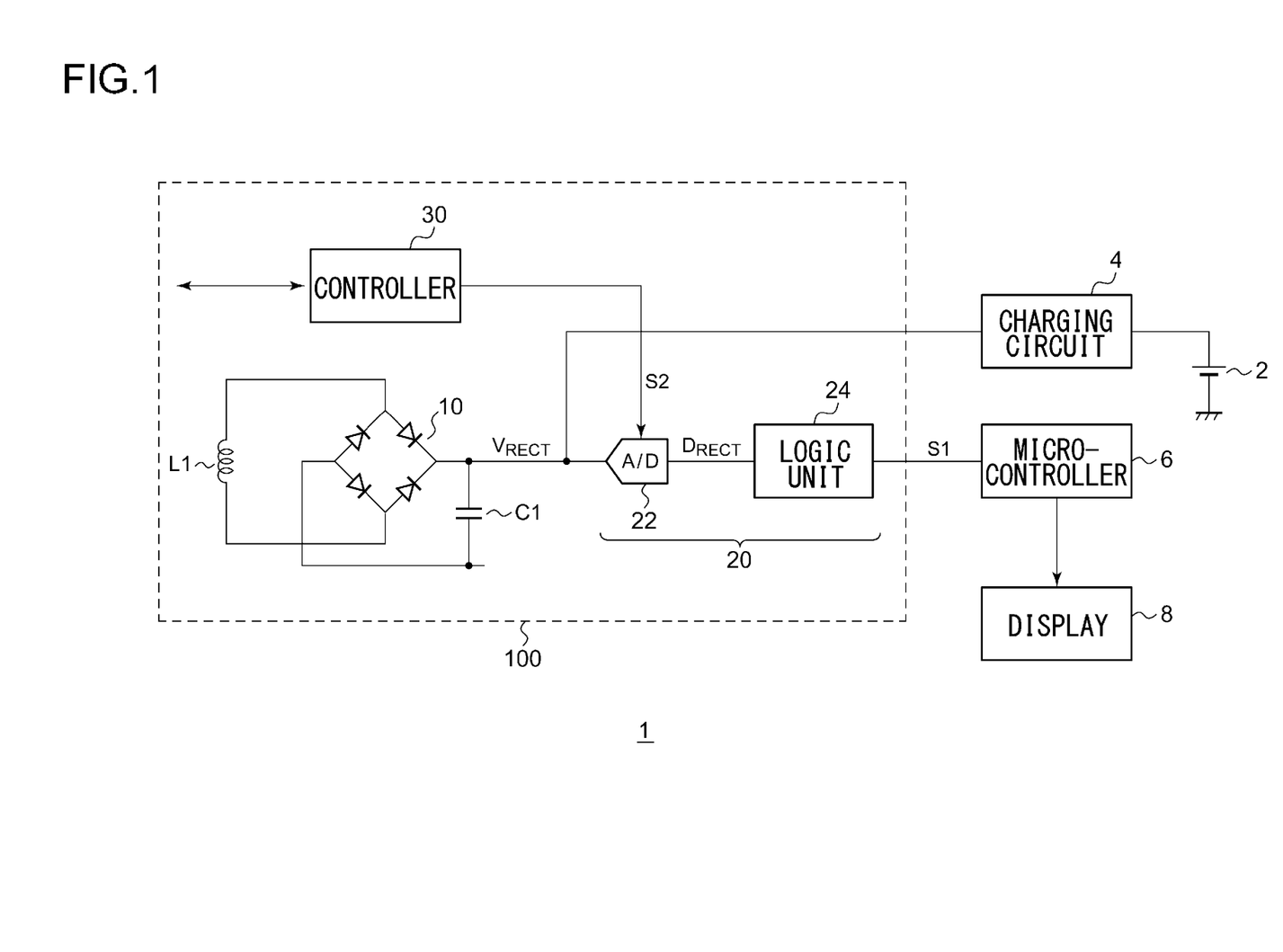
FIG. 1 is a circuit diagram showing a configuration of an electronic device including a power receiving apparatus according to a first embodiment.

FIG. 1 is a circuit diagram showing a configuration of an electronic device 1 including a power receiving apparatus 100 according to a first embodiment.

The electronic device 1 is configured as a tablet PC (Personal Computer), a laptop PC, a cellular phone terminal, a digital still camera, a digital video camera, a portable audio player, a PDA (Personal Digital Assistant), or the like. The electronic device 1 further includes a secondary battery 2, a charging circuit 4, a micro-controller 6, a display apparatus 8, and the like, in addition to the power receiving apparatus 100.

The power receiving apparatus 100 receives an AC power signal from an unshown power supply apparatus, converts the AC power signal thus received into DC voltage, and supplies the DC voltage thus converted to the charging circuit 4. The charging circuit 4 receives the rectified DC voltage $V_{RECT}$ from the power receiving apparatus 100, and charges the secondary battery 2. Also, other kinds of electric storage devices such as an electric double-layer capacitor may be provided instead of the secondary battery 2.

The micro-controller 6 is configured as a CPU (Central Processing Unit) that integrally controls the overall operation of the electronic device 1. For example, the micro-controller 6 generates an image to be displayed on the display apparatus 8.

The above is the overall configuration of the electronic device 1. Next, description will be made regarding the configuration of the power receiving apparatus 100. Description will be made in the present embodiment assuming that the power receiving apparatus 100 conforms to the Qi standard.

The power receiving apparatus 100 includes a reception coil L1, a rectifier circuit 10, a smoothing capacitor C1, a judgment unit 20, and a controller 30.

In the power supply operation, the reception coil L1 is located in the vicinity of the transmission coil (not shown) of the power supply apparatus. When AC current flows through the transmission coil of the power supply apparatus, an AC coil current $I_{L1}$ flows through the reception coil L1 due to electromagnetic induction. The rectifier circuit 10 performs full-wave rectification of the coil current $I_{L1}$. The rectifier circuit 10 may be configured as a diode-bridge circuit. Also, the rectifier circuit 10 may be configured as a bridge circuit employing switches such as transistors or the like.

The smoothing capacitor C1 is connected to the output terminal of the rectifier circuit 10, which smooths the voltage that is full-wave rectified by the rectifier circuit 10. Thus, the smoothing capacitor C1 generates a DC rectified voltage $V_{RECT}$. The power receiving apparatus 100 supplies the rectified voltage $V_{RECT}$ to the charging circuit 4. It should be noted that the power receiving apparatus 100 may further include a switching regulator that steps up or steps down the rectified voltage $V_{RECT}$, and that supplies the rectified voltage $V_{RECT}$ thus stepped up or stepped down to the charging circuit 4.

The controller 30 performs bidirectional communication with the power supply apparatus so as to execute authentication and a power supply sequence control operation.

The judgment unit 20 generates a notification signal S1 that corresponds to a comparison result obtained by comparison between a predetermined threshold voltage $V_{TH}$ and the voltage $V_{RECT}$ at the smoothing capacitor C1 at a judgment timing after the start of reception of a signal from the power supply apparatus. As an example, the notification signal S1 may be configured such that, when $V_{RECT} > V_{TH}$, the notification signal S1 is set to high level, and when $V_{RECT} < V_{TH}$, the notification signal S1 is set to low level.

Specifically, the judgment unit 20 includes an A/D converter 22 and a logic unit 24. The A/D converter 22 converts the voltage $V_{RECT}$ across the smoothing capacitor C1 into a digital value $D_{RECT}$ at a timing according to an instruction from the controller 30. At a judgment timing after the start of reception of a signal from the power supply apparatus, the logic unit 24 compares the digital value $D_{RECT}$ with a predetermined threshold value $D_{TH}$ that corresponds to the threshold voltage $V_{TH}$, and generates the notification signal S1 according to the comparison result. The threshold value $D_{TH}$ may be changed according to the setting value stored in the corresponding register.

The controller 30 measures the elapsed time from the start of reception of a signal from the power supply apparatus, and generates a timing signal S2 which is asserted (e.g., set to high level) at a judgment timing after a predetermined time has elapsed. The A/D converter 22 acquires the rectified voltage $V_{RECT}$ in synchronization with the timing signal S2. Preferably, the judgment timing may be positioned after a predetermined time elapses after the start of reception of a signal from the power supply apparatus.

With the Qi standard, the power supply operation is performed according to the following sequence.
Selection phase
Ping phase
Identification and configuration phase
Power transfer phase In the selection phase, the power supply apparatus performs an object search operation so as to detect whether or not there is an object on the power supply surface provided by the power supply apparatus, and selects an object to be supplied with electric power. Subsequently, the phase transits to the ping phase. In the ping phase, the power supply apparatus judges whether or not the object thus selected includes the power receiving apparatus 100 to be supplied with electric power. In the subsequent identification and configuration phase, the power supply apparatus acquires information with respect to the power receiving apparatus 100 so as to perform preparations to supply power. In the subsequent power transfer phase, the power transfer is performed.

The judgment timing is preferably included in the ping phase or otherwise in the identification and configuration phase defined according to the Qi standard. With the present embodiment, the judgment timing is positioned immediately before the end of the identification and configuration phase. After the transition to the ping phase, the controller 30 starts to perform time measurement, and asserts the timing signal S2 after a predetermined time τ elapses.

Figure 2:
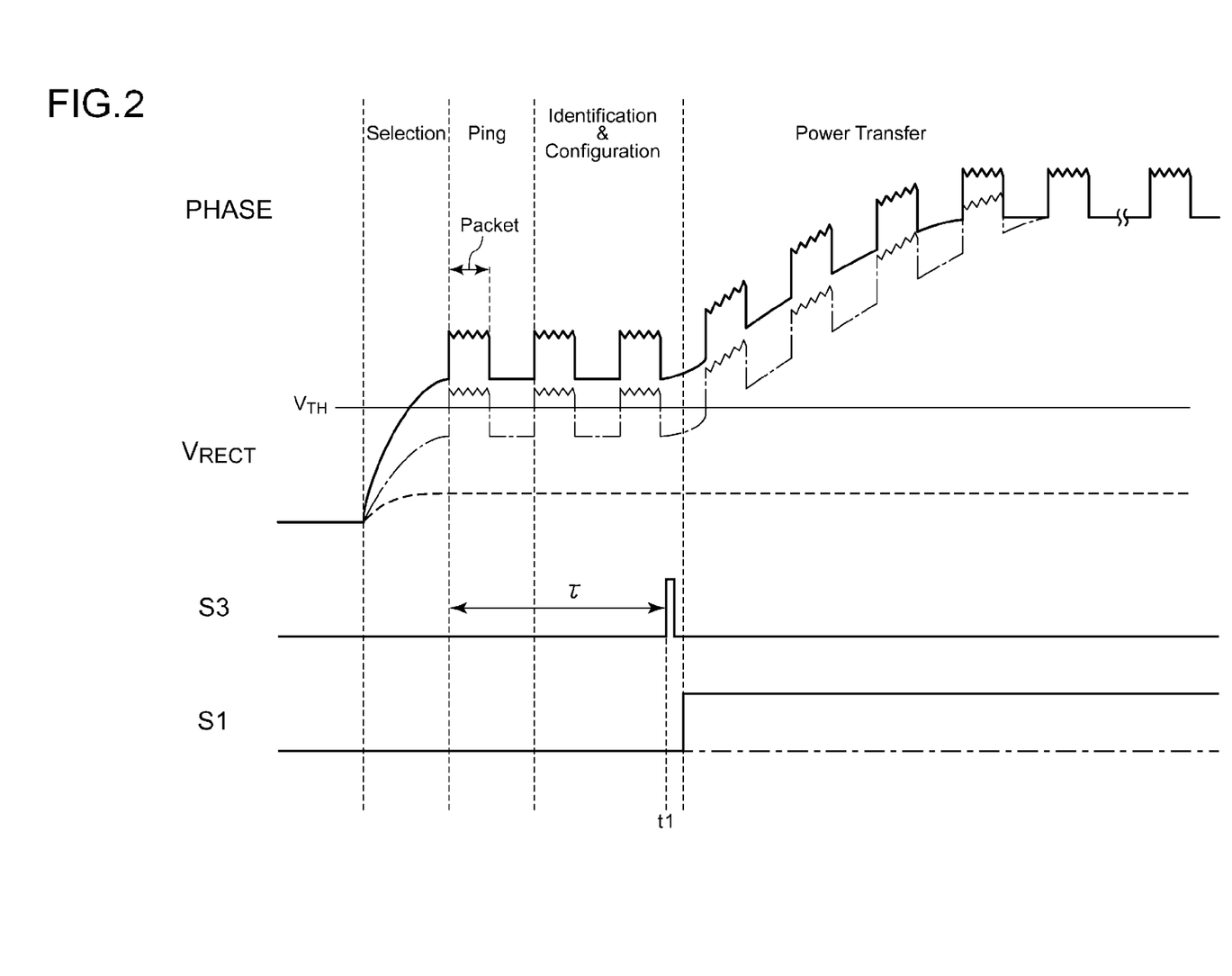
FIG. 2 is an operation waveform diagram showing the operation of the power receiving apparatus shown in FIG. 1.

The above is the configuration of the power receiving apparatus 100. Next, description will be made regarding the operation of the power receiving apparatus 100. FIG. 2 is an operation waveform diagram showing the operation of the power receiving apparatus 100 shown in FIG. 1.

Three waveforms are shown in the drawing for the voltage $V_{RECT}$, which are represented by the solid line, the line of alternately long and short dashes, and the broken line. The solid line represents a case in which the reception coil L1 is located at a suitable position. The line of alternately long and short dashes represents a case in which the reception coil L1 deviates from the suitable position. The broken line represents a case in which the reception coil L1 deviates to a position where the power cannot be supplied.

First, in the selection phase, the power supply apparatus supplies a predetermined signal. As represented by the solid line, in a case in which the reception coil L1 is located at a suitable position, in the selection phase, the smoothing capacitor C1 is sufficiently charged by the signal generated by the power supply apparatus.

In the subsequent ping phase and identification and configuration phase, the baseline of the voltage $V_{RECT}$ is approximately constant. After the completion of identification, the phase transits to the power transfer phase. In this phase, electric power is supplied, which raises the voltage $V_{RECT}$ with time.

It should be noted that the rectified voltage $V_{RECT}$ rises with respect to the baseline with a short period in a time sharing manner. Such a rise of the rectified voltage $V_{RECT}$ occurs due to a packet transmission operation of the controller 30 for transmitting a packet to the power supply apparatus.

When the reception coil L1 is located at a suitable position, and there is no foreign substance or the like in the vicinity of the reception coil L1, the rectified voltage $V_{RECT}$ is greater than the threshold voltage $V_{TH}$ at the judgment timing t1. In this case, the notification signal S1 is asserted (set to high level).

In contrast, when the reception coil L1 deviates from an optimum position, or otherwise when there is a foreign substance in the vicinity of the reception coil L1, as represented by the line of alternately long and short dashes, in the selection phase, the smoothing capacitor C1 is also charged corresponding to a signal generated by the power supply apparatus. However, the coil current induced at the reception coil L1 is small, leading to a small charging current applied to the smoothing capacitor C1. In this case, the rectified voltage $V_{RECT}$ is lower than the threshold voltage $V_{TH}$ at the judgment timing t1. Thus, the notification signal S1 is not asserted (set to low level).

When the reception coil L1 is located at an unsuitable position or otherwise when there is a foreign substance between the reception coil L1 and the transmission coil, this leads to reduction in the signal magnitude received from the transmission coil. In this case, as represented by the broken line, there is almost no rise of the rectified voltage $V_{RECT}$. In this case, the judgment unit 20 does not perform the level comparison.

The above is the operation of the power receiving apparatus 100.

The power receiving apparatus 100 has the following advantages.

Immediately after the start of the signal transmission from the power supply apparatus, the control operation for power transmission is not performed. Accordingly, the voltage $V_{RECT}$ that develops at the smoothing capacitor C1 exhibits a level that corresponds to the degree of coupling between the transmission coil and the reception coil L1. With the power receiving apparatus 100, by monitoring the voltage $V_{RECT}$ at the smoothing capacitor C1 at a judgment timing before the power supply apparatus starts to control the power supply, such an arrangement is capable of detecting deviation of the position of the reception coil L1.

Furthermore, in the ping phase and in the identification and configuration phase, the voltage $V_{RECT}$ at the smoothing capacitor C1 is in a stable state. Thus, by monitoring the voltage $V_{RECT}$ in such a period, such an arrangement is capable of detecting deviation of the position of the reception coil L1 with high precision. In particular, immediately before the end of the identification and configuration phase, the base level of the voltage $V_{RECT}$ is in the most stable state. In addition, no packet communication is performed in this period. Thus, such a time point immediately before the end of the identification and configuration phase can be suitably employed as the judgment timing.

As described above, the notification signal S1 indicates the position relation between the transmission coil and the reception coil L1. Thus, such an arrangement allows the electronic device 1 to execute various kinds of processing as described below according to the notification signal S1.

For example, the micro-controller 6 supplies the display apparatus 8 with predetermined information according to the notification signal S1. Specifically, such an arrangement instructs the display apparatus 8 to display an image which suggests to the user that the electronic device 1 is located at an unsuitable position. Such a suggestion image is not restricted to a moving image or a still image. Also, various kinds of data may be employed as such a suggestion image, examples of which include an icon, text, and the like.

In addition to or instead of the display operation of the display apparatus 8, the micro-controller 6 may output, via an unshown speaker, an audio warning which suggests to the user that the electronic device 1 is located at an unsuitable position.

In addition, the electronic device 1 is configured to transmit a signal to the power supply apparatus according to the notification signal S1. Specifically, a signal that corresponds to the notification signal S1 is transmitted from the controller 30 to the power supply apparatus. This allows the power supply apparatus to perform processing according to the notification signal S1. For example, such an arrangement allows the power supply apparatus to sound an alarm that suggests that the electronic device 1 is located at an unsuitable position, and to suspend the power supply operation.

Next, description will be made regarding a modification of the power receiving apparatus 100 shown in FIG. 1.

First Modification

Figure 3:
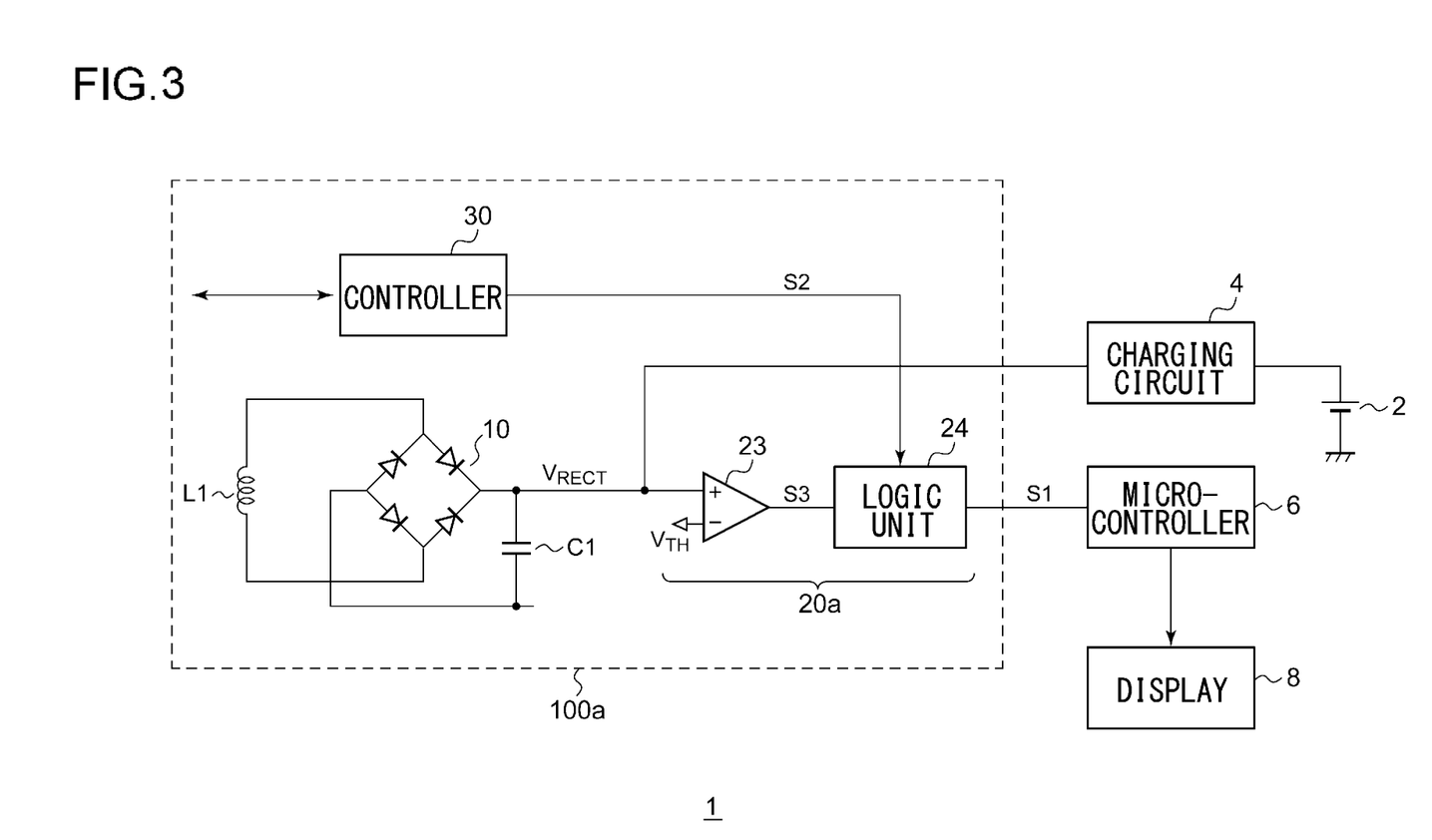
FIG. 3 is a circuit diagram showing a power receiving apparatus according to a first modification.

FIG. 3 is a circuit diagram showing a power receiving apparatus 100a according to a first modification. A judgment unit 20a included in the power receiving apparatus 100a includes a comparator 23 instead of the A/D converter 22 shown in FIG. 1.

The comparator 23 compares the voltage $V_{RECT}$ at the smoothing capacitor C1 with a predetermined threshold value $V_{TH}$, and generates a comparison signal S3 which indicates the comparison result. Specifically, the comparison signal S3 is configured such that, when $V_{RECT} > V_{TH}$, the comparison signal S3 is set to high level, and when $V_{RECT} < V_{TH}$, the comparison signal S3 is set to low level.

The logic unit 24a receives a timing signal S2 from the controller 30 as an input signal. The logic unit 24a generates a notification signal S1 based on a comparison signal S3 at a judgment timing. Specifically, when the comparison signal S3 is high level at the judgment timing, i.e., when $V_{RECT} > V_{TH}$ at the judgment timing, the notification signal S1 is set to high level. When the comparison signal S3 is low level at the judgment timing, i.e., when $V_{RECT} < V_{TH}$ at the judgment timing, the notification signal S1 is set to low level.

The power receiving apparatus 100a having such a configuration also provides the same advantages as those provided by the power receiving apparatus 100 shown in FIG. 1.

Second Modification

With the power receiving apparatus 100 shown in FIG. 1, the threshold value $D_{TH}$ may be generated as described below. The judgment unit 20 receives a threshold voltage $V_{TH}$ as an external signal. The A/D converter 22 or otherwise a different A/D converter (not shown) converts the threshold voltage $V_{TH}$ into the digital value $D_{TH}$ at a setting timing according to an instruction from the controller 30. The setting timing is preferably set to a timing after the start of reception of a signal from the power supply apparatus and before the judgment timing. Also, the setting timing may be positioned in the vicinity of the boundary between the selection phase and the ping phase.

Second Embodiment

The power receiving apparatus 100 according to a second embodiment has the same configuration as that according to the first embodiment. Accordingly, description will be made with reference to FIG. 1.

Description has been made in the first embodiment regarding an arrangement in which the voltage $V_{RECT}$ across the smoothing capacitor C1 is compared with the predetermined threshold voltage $V_{TH}$ so as to generate the notification signal S1 which indicates whether or not there is a problem of low power supply efficiency due to deviation of the coil position or otherwise a foreign substance in the vicinity of the coil. In contrast, in the second embodiment, the judgment unit 20 generates a detection signal S1 having a level that corresponds to the voltage $V_{RECT}$ that develops at the smoothing capacitor C1.

The A/D converter 22 converts the rectified voltage $V_{RECT}$ that develops at the judgment timing into the digital value $D_{TH}$. The logic unit 24 generates the detection signal S1 according to the digital value $D_{TH}$. The detection signal S1 may be configured as the digital value $D_{TH}$ itself, or otherwise as a value obtained by encoding the digital value $D_{TH}$ by means of predetermined calculation or otherwise by means of table reference. In a case in which the detection signal S1 is configured as a $2^N$ multi-level signal (N represents an integer) which indicates deviation of the coil position, the logic unit 24 may extract the upper N bits of the digital value $D_{TH}$.

As described above, the rectified voltage $V_{RECT}$ at the judgment timing depends on the power supply efficiency. That is to say, there is a correlation between the voltage $V_{RECT}$ at the judgment timing and the position of the reception coil L1. In other words, it can be said that the voltage $V_{RECT}$ indicates the deviation of the position of the reception coil L1 from an optimum position. With the second embodiment, such an arrangement allows the electronic device 1 to acquire information with respect to the relative position relation between the reception coil L1 and the transmission coil.

Also, the micro-controller 6 may display information that corresponds to the detection signal S1 on the display apparatus 8. For example, the micro-controller 6 may display a graphical image showing the power supply apparatus and the electronic device on the display apparatus 8, and may change the position relation between the power supply apparatus and the electronic device displayed on the display apparatus 8 according to the detection signal S1. Specifically, when the detection signal S1 has a large value, i.e., when power transmission efficiency is high, the micro-controller 6 may display an image which shows a state in which the electronic device is located at a suitable position with respect to the power supply apparatus. In contrast, when the detection signal S1 has a small value, i.e., when power transmission efficiency is low, the micro-controller 6 may display an image showing a state in which the electronic device has deviated from a suitable position with respect to the power supply apparatus.

Alternatively, the micro-controller 6 may display an object having a shape that corresponds to the value of the detection signal S1 on the display apparatus 8. Also, the micro-controller 6 may control the color, the brightness, or the size of the object according to the detection signal S1.

Such an operation allows the user to understand the position relation between the electronic device 1 and the power supply apparatus via the sense of sight in an intuitive manner, thereby allowing the user to modify the position of the electronic device 1.

Also, the micro-controller 6 may output an audio signal via an unshown speaker according to the value of the detection signal S1. Specifically, the micro-controller 6 may control the frequency, volume, or kind of the audio signal or otherwise a desired combination thereof, according to the detection signal S1.

This allows the user to understand the position relation between the electronic device 1 and the power supply apparatus via the sense of hearing in an intuitive manner, thereby allowing the user to modify the position of the electronic device 1.

Next, description will be made regarding a modification of the second embodiment.

Third Modification

The power receiving apparatus according to the second embodiment may be configured in the same manner as in the power receiving apparatus 100a shown in FIG. 3. That is to say, the power receiving apparatus may include multiple comparators 23 configured to compare the rectified voltage $V_{RECT}$ with multiple different threshold voltages $V_{TH}$, so as to generate the detection signal S1.

Figure 4:
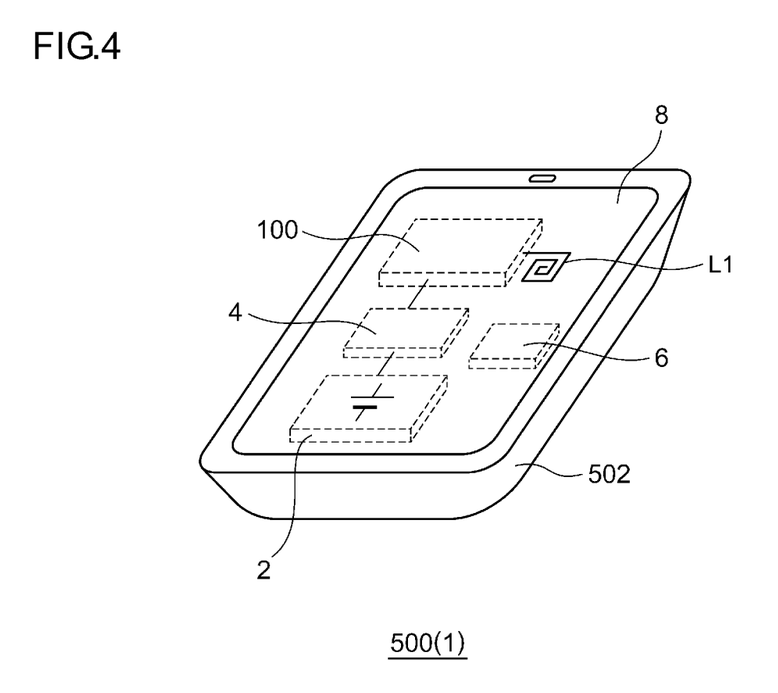
FIG. 4 is an electronic device including a power receiving apparatus.

Lastly, description will be made regarding a specific example of the electronic device 1. FIG. 4 is a diagram showing an electronic device including the power receiving apparatus 100. An electronic device 500 shown in FIG. 4 is configured as a tablet PC, a portable game machine, a portable audio player, or the like. A casing 502 houses the secondary battery 3, the charging circuit 4, the micro-controller 6, and the power receiving apparatus 100.

Description has been made regarding the present invention with reference to the first and second embodiments. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Description has been made in the embodiments regarding a power receiving apparatus that conforms to the Qi standard. However, the present invention is not restricted to such an arrangement. Also, the present invention is applicable to a power receiving apparatus that conforms to a standard which will be developed in the future.

While the preferred embodiments of the present invention have been described using specific terms, such description is for illustrative purposes only, and it is to be understood that changes and variations may be made without departing from the spirit or scope of the appended claims.

What is claimed is:

1. A wireless power receiving apparatus comprising:
   a reception coil;
   a rectifier circuit that rectifies a current that flows through the reception coil;
   a smoothing capacitor connected to an output of the rectifier circuit; and
   a judgment unit that generates a notification signal that corresponds to a comparison result obtained by comparing a voltage across the smoothing capacitor with a predetermined threshold voltage at a judgment timing,
   wherein the judgment timing is occurs after the wireless power receiving apparatus starts to receive a signal from a power supply apparatus, wherein the judgement timing occurs after a predetermined period of time elapses after a phase transition from a first phase to a second phase, wherein in the first phase, the power supply apparatus performs a search operation so as to detect whether or not there is an object on a power supply surface of the power supply apparatus.

2. The wireless power receiving apparatus according to claim 1, wherein the judgment unit comprises:
   an A/D converter that converts the voltage across the smoothing capacitor at the judgment timing into a digital value; and
   a logic unit that compares the digital value with a predetermined threshold value, and that generates the notification signal that corresponds to the comparison result.

3. The wireless power receiving apparatus according to claim 1, wherein the judgment unit comprises:
   a comparator that compares the voltage across the smoothing capacitor with a predetermined threshold value, and that generates a comparison signal which indicates the comparison result; and
   a logic unit that generates the notification signal based on the comparison signal at the judgment timing.

4. The wireless power receiving apparatus according to claim 1, wherein the judgment timing occurs after a predetermined period of time elapses after the start of reception of the signal from the power supply apparatus.

5. An electronic device comprising:
   the wireless power receiving apparatus according to claim 1; and
   a display apparatus,
   wherein the display apparatus displays an image that suggests that the electronic device is located at an unsuitable position according to the notification signal.

6. An electronic device comprising the wireless power receiving apparatus according to claim 1, configured to transmit, to the power supply apparatus, a signal that corresponds to the notification signal generated by the wireless power receiving apparatus.

7. A wireless power receiving apparatus comprising:
   a reception coil;
   a rectifier circuit that rectifies a current that flows through the reception coil;
   a smoothing capacitor connected to an output of the rectifier circuit; and
   a judgment unit that generates a notification signal that corresponds to a comparison result obtained by comparing a voltage across the smoothing capacitor with a predetermined threshold voltage at a judgement timing, wherein the judgement timing occurs after the wireless power receiving apparatus starts to receive a signal from a power supply apparatus, wherein the judgement timing occurs in a second phase in which the power supply apparatus judges whether or not a selected object includes the wireless power receiving apparatus to be supplied with electric power, or otherwise in a subsequent third phase in which the power supply apparatus acquires information with respect to the wireless power receiving apparatus and performs preparations to supply power.

8. The wireless power receiving apparatus according to claim 7, wherein the judgment timing occurs immediately before the end of the third phase.

9. An electronic device comprising:
   the wireless power receiving apparatus according to claim 7; and
   a display apparatus,
   wherein the display apparatus displays an image that suggests that the electronic device is located at an unsuitable position according to the notification signal.

10. An electronic device comprising the wireless power receiving apparatus according to claim 7, configured to transmit, to the power supply apparatus, a signal that corresponds to the notification signal generated by the wireless power receiving apparatus.

11. A wireless power receiving apparatus comprising:
    a reception coil;
    a rectifier circuit that rectifies a current that flows through the reception coil;
    a smoothing capacitor connected to an output of the rectifier circuit; and
    a judgement unit that generates a detection signal that corresponds to a voltage across the smoothing capacitor at a judgement timing, wherein the judgement timing occurs after the start of reception of a signal from a power supply apparatus, wherein the judgment timing occurs after a predetermined period of time elapses after a phase transition to a second phase after an end of a first phase in which the power supply apparatus performs a search operation so as to detect whether or not there is an object on a power supply surface provided by the power supply apparatus.

12. An electronic device comprising:
    the wireless power receiving apparatus according to claim 11; and
    a display apparatus,
    wherein the electronic device is configured to instruct the display apparatus to display information that corresponds to the detection signal.

13. An electronic device comprising the wireless power receiving apparatus according to claim 11, configured to transmit, to the power supply apparatus, information that corresponds to the detection signal received from the wireless power receiving apparatus.

14. A wireless power receiving apparatus comprising:
    a reception coil;
    a rectifier circuit that rectifies a current that flows through the reception coil;
    a smoothing capacitor connected to an output of the rectifier circuit; and
    a judgement unit that generates a detection signal that corresponds to a voltage across the smoothing capacitor at a judgement timing, wherein the judgement timing occurs after the start of reception of a signal from a power supply apparatus, wherein the judgment timing occurs in a second phase in which the power supply apparatus judges whether or not a selected object includes a wireless power receiving apparatus to be supplied with electric power, or otherwise in a subsequent third phase in which the power supply apparatus acquires information with respect to the wireless power receiving apparatus and performs preparations to supply power.

15. The wireless power receiving apparatus according to claim 14, wherein the judgment timing occurs immediately before the end of the third phase.

16. An electronic device comprising:
the wireless power receiving apparatus according to claim 14; and
a display apparatus,
wherein the electronic device is configured to instruct the display apparatus to display information that corresponds to the detection signal.

17. An electronic device comprising the wireless power receiving apparatus according to claim 14, configured to transmit, to the power supply apparatus, information that corresponds to the detection signal received from the wireless power receiving apparatus.

* * * * *